United States Patent [19]

Leitz

[11] Patent Number: 4,964,767
[45] Date of Patent: Oct. 23, 1990

[54] METHOD FOR COMBINING INDIVIDUAL ROAD-TRANSPORT WITH RAIL-BOUND TRAIN-TRANSPORT, AND APPARATUS FOR IMPLEMENTING THE METHOD

[76] Inventor: Ludwig Leitz, Laufdorfer Weg 33, D-6330 Wetzlar, Fed. Rep. of Germany

[21] Appl. No.: 271,291

[22] Filed: Nov. 15, 1988

[30] Foreign Application Priority Data

Nov. 20, 1987 [DE] Fed. Rep. of Germany ....... 3739277

[51] Int. Cl.$^5$ .......................... B61D 15/00; B60P 3/77
[52] U.S. Cl. ....................................... 410/65; 105/159
[58] Field of Search ......................... 410/67, 65, 9, 56; 105/159; 414/343, 786

[56] References Cited

U.S. PATENT DOCUMENTS

| | | | |
|---|---|---|---|
| 1,828,145 | 10/1931 | Johnston | 410/9 |
| 2,121,181 | 6/1938 | Bayerl | 105/159 |
| 2,656,942 | 10/1953 | Helms | 410/67 X |
| 2,691,450 | 10/1954 | Rosenbaum | 414/343 |
| 3,102,646 | 9/1963 | Clyan | 410/56 X |
| 3,576,167 | 4/1971 | Macomber | 105/159 X |

FOREIGN PATENT DOCUMENTS 239304 3/1965 Austria ................................. 414/343
273354 7/1988 European Pat. Off. ............. 410/56
1031726 6/1958 Fed. Rep. of Germany .

Primary Examiner—Andres Kashnikow
Assistant Examiner—Kevin P. Weldon
Attorney, Agent, or Firm—Wells & White

[57] ABSTRACT

Individual road transport and rail-bound transport are combined with rapid transfer from one transport mode to the other. The transport units for individual traffic are semi-trailer trucks. The load and transported-material bearing semi-trailer are transferred by cross-rolling onto the low-platform railroad car for rail-bound shipping. The tractor-truck serves only as a power plant and supports docking. Thereafter the tractor is again available for other transports in individual traffic. The energy of motion is supplied from the tractor-truck through extensible power or air lines to the semi-trailer and these lines are disconnected following docking. Locks are provided to secure the position of the semi-trailer on the low-platform railroad car and these locks are of the self-service type. Means for anti-tipping are provided at the apron and/or at the low-platform railroad cars to prevent their tipping during load transfer. These means for anti-tipping consist of latches movable along the low-platform railroad cars which engage matching shaped-sections at the apron.

12 Claims, 6 Drawing Sheets

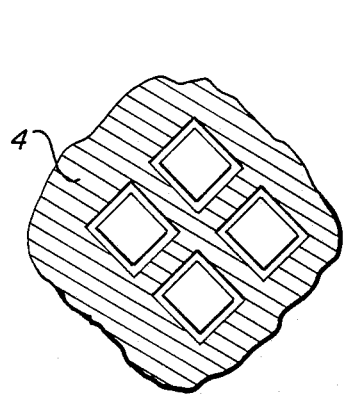
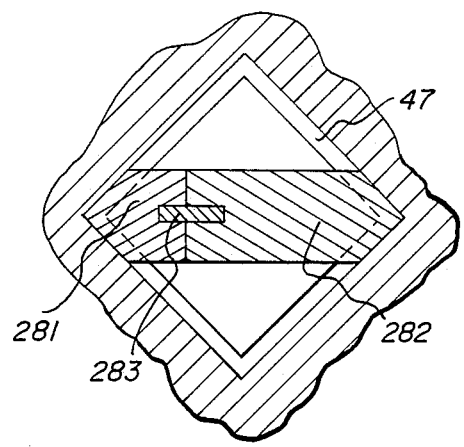
FIG.5a                FIG.5b
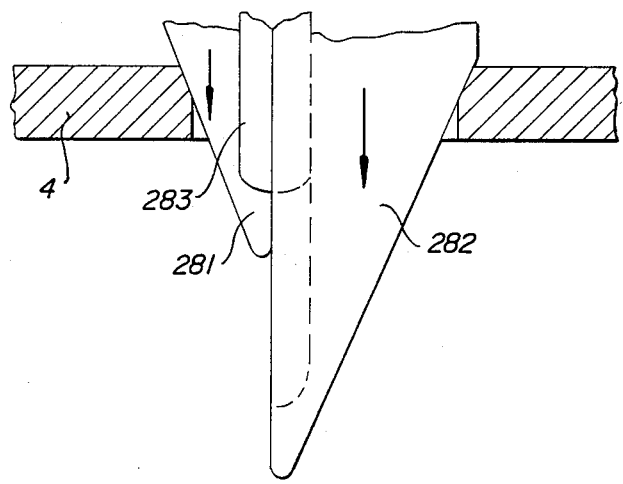
FIG. 6

METHOD FOR COMBINING INDIVIDUAL ROAD-TRANSPORT WITH RAIL-BOUND TRAIN-TRANSPORT, AND APPARATUS FOR IMPLEMENTING THE METHOD

BACKGROUND OF THE INVENTION

The present invention is concerned with a method for combining individual transport on roads with rail-bound transport by train, with rapid changeover from one transport mode to the other.

West German published patent application 34 25 698, the disclosure of which is incorporated herein by reference, discloses apparatus having an undercarriage for cross-rolling a road vehicle.

The advantage of road traffic is that of individually transporting persons or goods at any time at any location to any other site located on a road. However, the drawback is that at least one driver is required for every vehicle, and this driver is stressed, especially on long itineraries, on account of constantly changing traffic conditions. Rail traffic, on the other hand, is a rigid system which however offers significant advantages for long hauls. The rails precisely prescribe the travel track, the locks releasing the tracks for traffic extensively avert impacts and other accidents even in poor visibility, and the probability of accidents is reduced by additional technical improvements and redundancy.

Accident statistics unequivocally are in favor of rail traffic. Developments to relieve truck drivers are still embryonic and one may firmly conclude from thorough consideration of the traffic matter that transient intervention to assist a vehicle-driver blackout is indeed conceivable. Also further relief for his attention is possible, but fully automatic control of all the moving vehicles in the individual traffic mode would be so costly and yet so unreliable that rail traffic would have to be invented if it were not already on the scene. Other important advantages of rail traffic are the four-fold improved energy efficiency, also the cleanest ecological power plant where an electric locomotive is used, and only one pair of conductors is needed for a long freight train.

The traditional system of freight shipping, still in use, employing freight cars, suffers from switching, entailing layover times using up a multiple of the travel time. An improvement is container traffic. Containers lack their own means of motion and require cranes, various handling equipment and associated operators, which are available in rationalized manner only at large reshipment centers. Stopovers cannot load on unload several or all cars in a few minutes and then let the roads and loading facilities be open again to the next traffic.

It has already been suggested to equip trucks with a sort of crane allowing containers to be raised by the driver himself from the truck onto a railway car, and vice-versa. However this requires a support system for the truck in addition to the apparatus to carry out this transfer, where this support system must always be carried along even when the truck is empty besides the loading frame.

Moreover, this support system is restrictive because the most common containers suited for this purpose are 20 feet long and amount to a rudimentary box restricted in length and inadequate for special shipments such as for refrigerated foodstuffs or for instance for liquids. There are many objects requiring greater lengths of containers, and such objects will be found in the 40-foot containers.

In the event of 40-foot containers, they are no longer suitable for the suggested rail-reloading equipment to be carried along on a truck for reasons of size and weight.

As regards larger containers, and special containers such as refrigeration containers for Argentinian meat, large ports have loading plants, cranes and so-called handling equipment with personnel.

However, this is not the case for smaller railroad stations which are connected to large European or national roads and may service long-distance hauls for originating traffic or may feed them to distribution.

SUMMARY OF THE INVENTION

The present invention has as an object combining the advantages of both systems in such a way, and to so complement them in relation to the long hauls increasingly significant in Europe that a substantially improved shipping system is created whereby rail and the road systems profit both and are mutually relieved.

The concept of the invention is to implement transfer between road and rail in technical and individual manner.

This object is achieved by combining individual transport by road and rail-bound train transport with rapid transfer between one transport mode to the other, wherein the transport units for individual transport are semi-trailer trucks and their load or good-transporting semi-trailers (2) are cross-rolled onto low-platform railroad cars (4) while the tractor truck (1) serves only during road shipping as support for part of the load and as power source and assists in docking and thereafter is used for other transport purposes in individual traffic.

The present invention is predicated on having transport units of the individual traffic being semi-trailer trucks and that only their trailers carrying the load and goods are moved in cross-rolling manner onto low-platform cars, whereas the tractor-truck only assists the docking maneuver and then is disconnected and used for other shipping in individual traffic.

The predominant concept is to make possible an individual transfer of the semi-trailers from road to rail using means available to the transport unit's driver and codriver themselves, so that several vehicles can simultaneously carry cut their transfers while remaining only a short time near the train, in the manner of self-service.

With this system, the most essential and delicate apparatus remains controlled by a single shipping company and its personnel, whereby clear-cut responsibility is established for business conduct and maintenance.

West German Published Patent Application 34 25 698 describes apparatus with undercarriage allowing cross-rolling a road vehicle. In this apparatus, however, the entire road vehicle is transferred to rail shipping, whereby, besides the actual net load, also the load of the power plant must be carried by rail. In the method of the present invention, on the other hand, only the semi-trailer itself with its net load is put on the train while the tractor-truck is available for other shipping. Moreover the swing-out plates 9 of the above described apparatus, being mounted above the track, represent a danger which is eliminated by the anti-tipping lock of the invention.

The transverse undercarriage, known from the West German application, at the semi-trailer does indeed require additional space for shipping by rail. But this drawback is widely compensated by the advantages of being permanently present at the semi-trailer and by its combination with the tractor-truck:

1. Rapid and reliable transfer to the rail vehicle is possible while being controlled only by the truck driver;
2. Even specialized semi-trailers such as for refrigerated shipping can be pulled down at any ramp set up at large highway intersections by any arbitrary semi-trailer;
3. It can be rapidly relocated on another train for truck intercity traffic;
4. The power sources from the tractor-truck are continuously available for electric power and for the hydraulic and pump systems for intermediate shipping;
5. This also applies to rail-to-autoferry transfers for short sea crossings over straits, to islands or for instance from Europe to North Africa;
6. The same applies to transfers from one rail gauge to another, such as from the West European gauge to the Russian, Spanish and Portuguese gauges;
7. The proposed combination also eases individual road traffic and the wheels carried along by the semi-trailer for cross-rolling are useful also in traffic and in parking in inner cities, narrow old towns, factories and construction sites;
8. This road-rail combination emphasizes the already known advantages of the semi-trailers: short loading times, least demand for space and energy when carrying no load because of the independent tractor-truck and in the concept of the invention, these advantages can be further rationalized with respect to time planning which can be controlled by telecommunication and computer techniques for all schedules, assuming there is adequate cooperation between the shipper and the railroad;
9. The railroad obtains improved utilization of the rolling stock and tracks and as regards the highways, which presently are overburdened already on weekends and especially during vacation time, there will be relief from the truck long-haul traffic which because of its low speeds leads to vehicle backups and dangerous passing;
10. Further relief of highways and improved utilization of the present railroad facilities and of those proposed by the invention are achieved by the also proposed simultaneous arrangement and utilization of same for the transport of passently-piggyback vehicles; and
11. Implementation and introduction of the proposed system will enhance the desired improved cooperation within the European community and between East and West.

BRIEF DESCRIPTION OF THE DRAWINGS

Three modes of implementation of the method of the present invention and pertinent apparatus are described below to illustrate three possible modes of the invention.

FIG. 4 is a cross-sectional elevation of an anti-tipping device for the low-platform cars when transferring by rolling;

FIGS. 5a, 5b and 6 are detailed showings of locking a semi-trailer onto a low-platform car;

DESCRIPTION OF THE PREFERRED EMBODIMENTS

Figure 1:
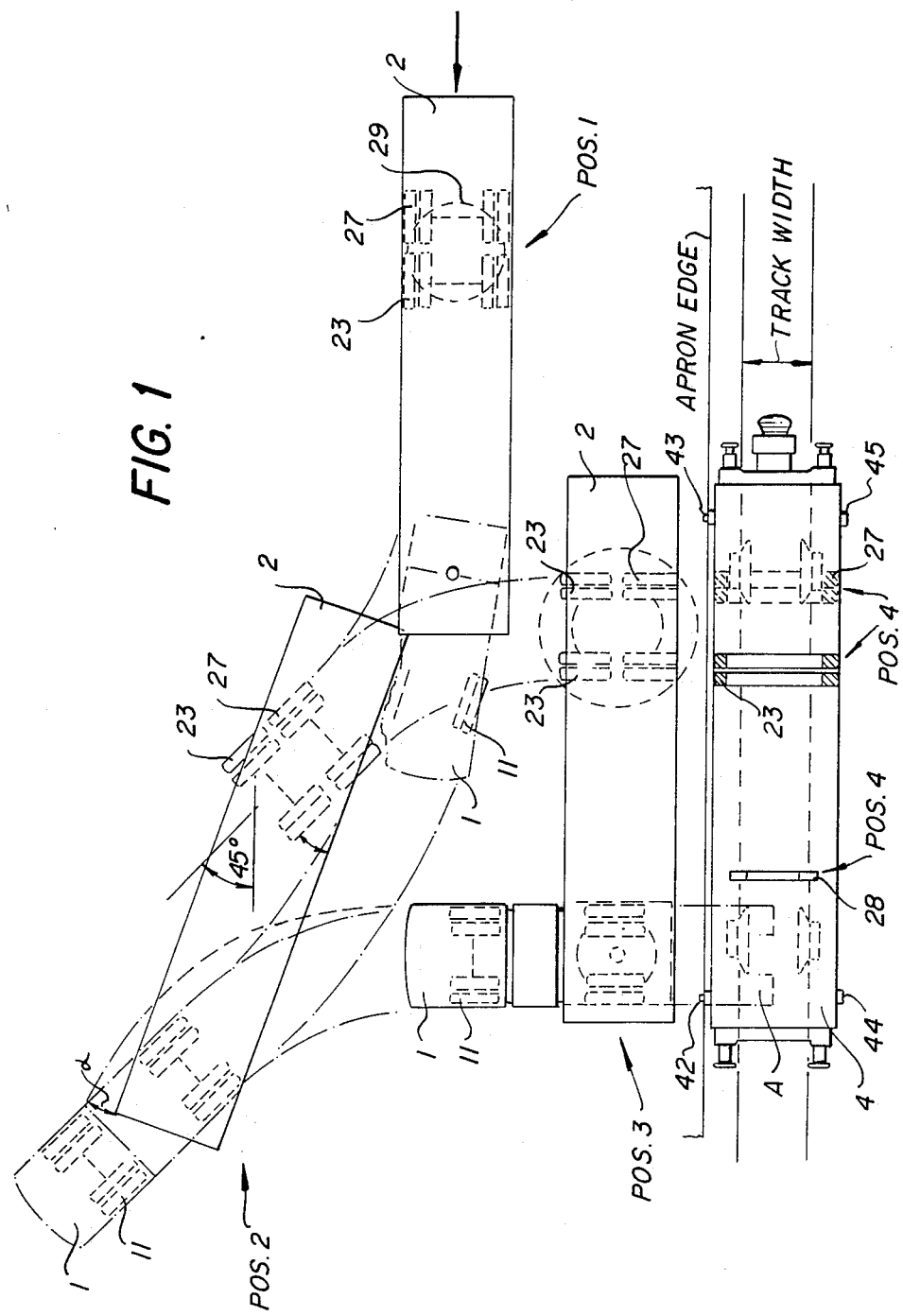
FIGS. 1, 2, and 3 are schematic plan views of the transfer from road or apron to the platform of a low-platform car at the same level as the road or apron.

By means of four marked positions "Pos. 1 to 4," FIG. 1 explains the docking maneuver of a semi-trailer assembly consisting of a tractor-truck 1 and semi-trailer 2, in one of the embodiments of the invention wherein semi-trailer wheels 23; 27 rest on a fifth wheel 29. Two front wheels 23 can be locked to more easily pivot the turntable 29, i.e., at less tire friction. In normal straight steering, fifth wheel 29 and wheels 23; 27 of the semi-trailer 2 are parallel to the direction of travel as shown in FIG. 1.

Figure 7A:
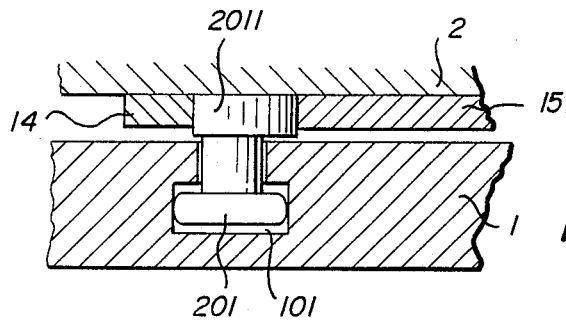
FIGS. 7a and 7b are showings in elevation at the top and topview at the bottom of the feasibility of mechanically sensing the angle of travel between a tractor-truck and a semi-trailer for feedback and control purposes.
Figure 7B:
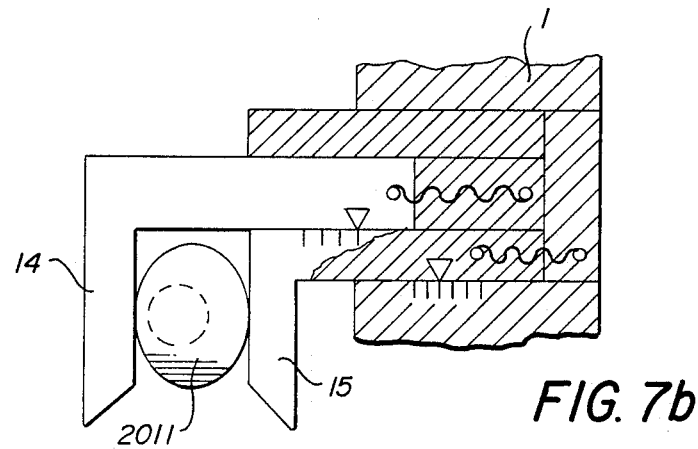

Pos. 1 shows the time of transition from straight travel to pivoting for docking--first toward Pos. 2 along a rightward curve. Front wheels 11 of the tractor-truck 1 already are steering slightly rearward. Next a control circuit (which is already present) is turned on which synchronizes by means of a suitable feedback system the angular position of the fifth wheel 29 of the semi-trailer wheels 23; 27 with the angular position of the tractor-truck relative to the semi-trailer. The power source for the feedback and control circuit is not shown in closer detail but all known means of precision mechanics and mechanical engineering employing elements of electrical and electronic engineering and/or of hydraulics or pneumatics may be used for transmission between the tractor-truck and the semi-trailer using conventional cables. FIGS. 7a and 7b schematically show that the angular feedback relating to tractor-truck and semi-trailer is problem-free, by employing mechanical sensing that can be transmitted electrically.

As shown in FIGS. 7a and 7b, the upper flange at the convention kingpin 201 of the semi-trailer 2 is in the shape of an elliptical cam 2011. Sliders 14 and 15 sensing the cam 2011 like a caliper rest on the tractor-truck 1 above the receiving seat 101 for the kingpin 201. The angular motion between the tractor-truck 1 and the semi-trailer 2 is converted thereby into a measurement of thickness which is independent of the longitudinal play of the kingpin 201 in the seat 11 relative to the lock. Information, however, being lacking whether the steering angle is leftward or rightward, the cam 2011 is made excentric relative to the kingpin 201. The measured value of the slider 15 relative to tractor-truck 1—indicated by a scale on 1 relative to an index of slider 15—in relation to the measured value between sliders 14 and 15 determines the electrically analyzable information in the light of the sign of the steering angle.

In Pos. 2, half the angle of rotation is arrived at with 45° for the 90° end position of the turntable 29 and the tractor-truck 1 relative to the semi-trailer 2. The steering angle of the front wheels 11 of the tractor-truck is back to zero because now, when backing toward Pos. 3, the wheels 11 and also the wheels 23 are steered toward the other side. One of the wheels 27 is equipped with a drive which shall be used and actuated at least when the push component of the tractor-truck 1 approaches zero when between Pos. 2 and Pos. 3. In order to achieve the proper position relative to the low-platform car in one approach—the latitude in positioning being quite scant—optical accessories, for instance zebra markings are present on the apron passage and corresponding signal means or lamps at the low-platform are present in advantageous manner. Taking up the Pos. 3 already before arrival of the train in this embodiment depends on how closely the railroad can keep the required tolerances.

When passing from Pos. 3 into Pos. 4, a problem arises in the load transfer of wheels 27 from the apron edge 31 to the platform of the low-platform car 4, and this problem is related to the historical narrow gauge of most European railroads which in FIG. 1 is 1435 mm. When the semi-trailer is fairly heavy, and especially when it is loaded substantially on one side, the low-platform car may tip over. To prevent such tipping, a number of methods may be resorted to. One way is shown in FIG. 4. For reasons of maintenance, low-platform cars are equipped with bumpers 42; 44 projecting beyond the platform. When the apron edges are provided with U-channels in concrete, especially on both sides of the apron, then protection against tipping is possible, especially advantageously when in lieu of the bumpers, sequentially mounted rollers staggered in height are used, of which the core is elastic so that the tipping forces can be absorbed. Another solution is described further below. If such steps cannot be carried out within an international railroad system, or for reasons of tolerances and standardization, then another alternative is to provide additional support wheels at the semi-trailer that also can be used in individual traffic, when parking or when shutting down.

Figure 2:
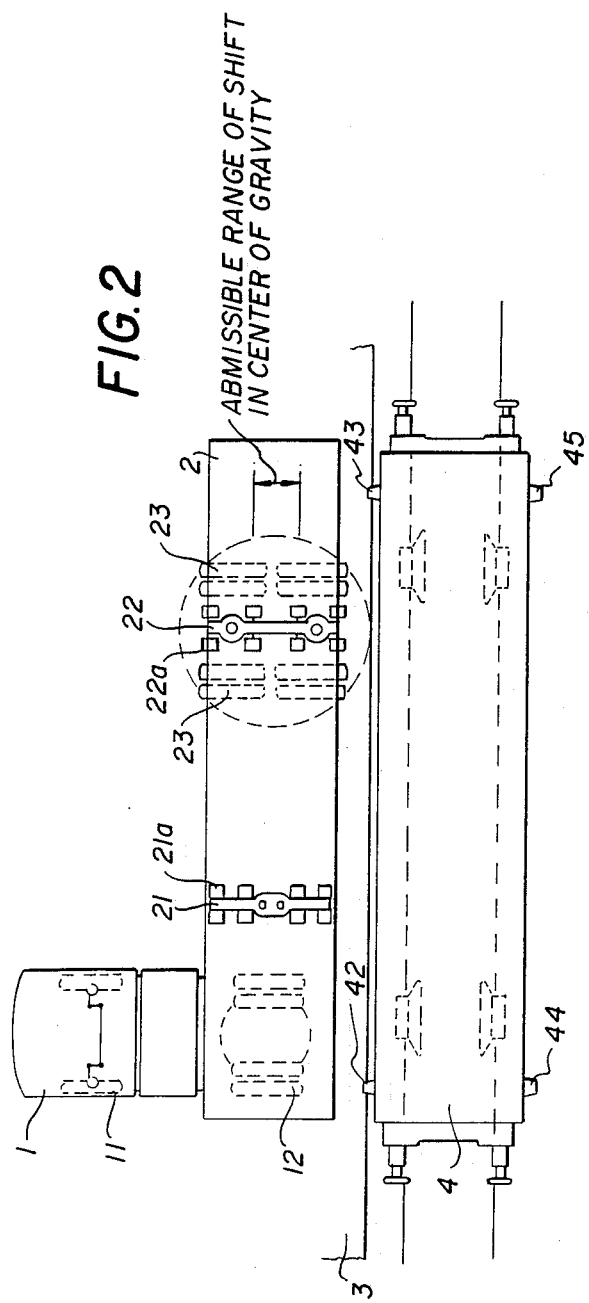

FIG. 2 shows one possible embodiment mode. Four pairs of rollers are mounted to each of two crossbars 21; 22 and are lowered in Pos. 3 and during the transition in such a manner that they absorb a great part of the load. When the semi-trailer rolls onto the low-platform car, the front support rollers already have moved into a contact location plumb above the rails before the remaining wheels, in particular the following support wheels, exert a tipping movement. In contrast to the embodiment of FIG. 3, in this embodiment the load-relief of the wheels 23 still remains within the elastic range, whereby the tire drive for rolling also is present.

The final position of Pos. 4 is reached when the wheels 23; 27 have assumed the marked positions on the low-platform car 4 and simultaneously the drive-wheel tracks of the tractor-truck have arrived at the site A. Thereupon the tractor-truck has achieved its task and following disconnection can return in forward motion to the apron for further tasks.

When aprons are present on both sides of the tracks, the approach maneuver for the above described design of semi-trailers also can be carried out with the tractor-truck 1 moving in "forward." Once the semi-trailer has reached the end position on the low-platform car, the tractor-truck's front wheels are on the opposite, second apron. Then the tractor-truck can move away over this apron. However, the semi-trailer 2 must be fixed to the low-platform car 4 before the tractor-truck is uncoupled and is moving away.

The conventional, hydraulically lowered support 28 is provided for that purpose with elastic and automatic (for instance, pneumatic/hydraulic) snap-in means locking the vehicle to the low-platform car so that this procedure too can be carried out rapidly and with economy relative to personnel. FIGS. 5a, 5b and 6 elucidate one possible way within a required range of tolerances. The same device as at the front also is provided at the rear. The platform of this low-platform car is provided at least at those places serving to lock with a grid of holes assuming a diamond-shape in topview as shown in FIGS. 5a and 5b. FIG. 5b shows a single hole denoted by 47. Wedge-shaped locks 281 and 282 rest in the support 28 and are guided in it also. They are driven down in the direction of the arrow by pneumatic-hydraulic means when the Pos. 4 is reached and support 28 is advanced. By means of the thrust of the wedge, the semi-trailer 2 is constrained to assume a symmetrical position relative to the low-platform car 4, provided that Pos. 4 has been reached to such an extent that the wedges can drop into the hole 47. This entails moreover that a slip-clutch be provided for the cross-drive and can be overcome by the thrust forces of the locking wedges. It is assumed in this embodiment that somewhat more play is permissible at the front and at the rear when positioning the semi-trailer. A guide absorbing the transverse forces is denoted by 283.

Figure 3:
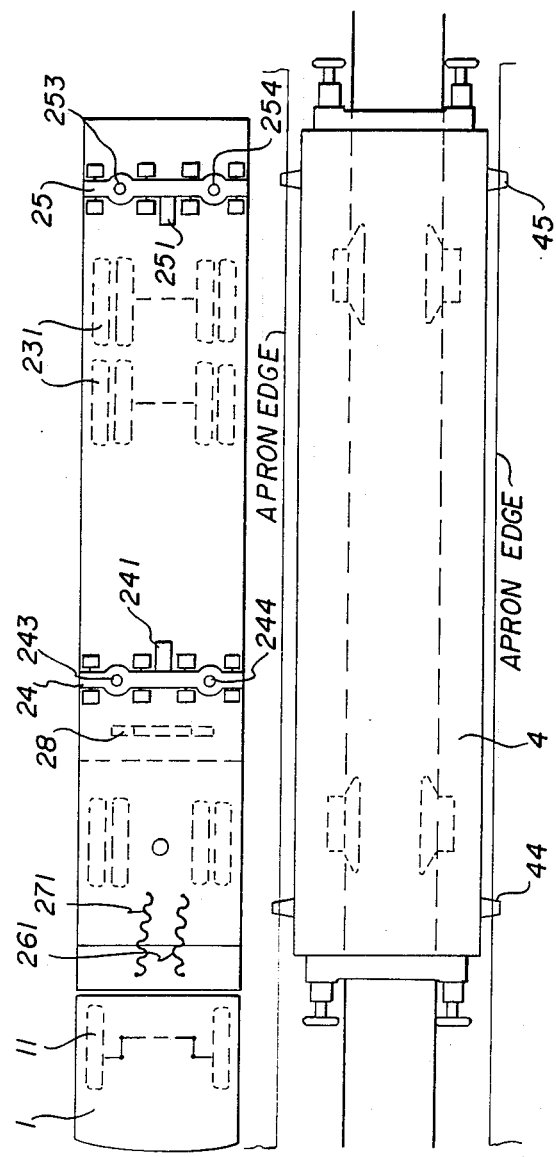

FIG. 3 is another mode of implementation of the concept of the invention. Here again the road-to-rail transfer takes place at the same level and by moving the road vehicle transversely to the train on the rails.

The rear wheels 231 and possibly further wheels of the semi-trailer are of conventional design and remain without support on a fifth wheel.

This embodiment offers the advantage of an already conventional variability of the wheel springs. Furthermore in this embodiment, the semi-trailer is made to roll transversely across the low-platform car 4 by the additional support rollers 24; 25 equipped with their own power-drives. Such drives may consist of electric motors 241; 245 which by means of self-locking worms each drive at least one or two pairs of wheels. The hydraulic actuators 243; 244; 253 and 254 lift the bars bearing the rollers and also lower them. All four hydraulic actuators may be eliminated when all normal wheels of the semi-trailer and also the rear wheels of the tractor-truck can be moved pneumatically-hydraulically to such an extent that only the transverse accessory wheels are being used and shall not interfere in this position with road travel. Alternatively both motions may be mutually complementary in order that smaller strokes shall suffice.

This embodiment mode offers the advantage that the Pos. 3b can be reached effortlessly directly before transfer and that still, after the arrival of the train, fine position control relative to the low-platform cars booked by the shipper can be carried out. Only then shall the tractor-truck be uncoupled; this tractor-truck in this embodiment mode was not used for the transverse push, but for the power supply, which requires that the power cables and hoses can extend enough to permit the uncoupling motion of the tractor-truck and the cross-motion of the semi-trailer. Once the final position has been reached and the semi-trailer is locked in place on the low-platform car, the power connections to the tractor-truck can be detached and henceforth, if power is required, for instance for refrigeration, a new hook-up to the train may be effected. Corresponding provision must be present in the train and at the low-platform cars. When the shipments are unloaded, the activities take place in the reverse sequence and directions.

Another advantage of this embodiment mode is the lesser space required by the aprons which will be wholly adequate when two lanes wide, and this shall be especially significant when aprons are provided on both sides of the track, namely as one-wall streets. In turn the advantage is obtained that the road vehicles can be arrayed alternatingly by "space and gap." Parking is facilitated thereby for delivery and receiving by the semi-trailer vehicles, whereby it is then possible to simultaneously and rapidly change places on all low-platform cars of a freight train.

Figure 11:
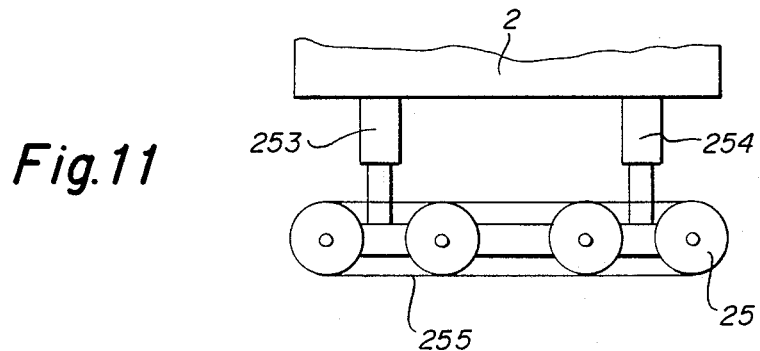
FIG. 11 shows in elevation accessory rollers being provided with a belt.

To forestall the danger that substantial gaps arise between the edges of the apron and of the low-platform car, Flexo bands or other apron lining may be placed around the cross-moving rollers 25 as shown in rear view in the elevation of FIG. 11.

The possible frequency of occupancy and the degree of exploitation are decisive factors relating to the economical operation of the equipment proposed herein and of the railroads. Bookings are required by the participating shippers, which can be implemented in known manner centrally and also in decentralized manner through a network and be stored, and which then may be used in conjunction with electronic control cards for vehicle use and invoicing. In that event, the shipping and pickup of the semi-trailers will be the task of the shippers who in the event of a driver being hampered or incapacitated may replace him by a colleague with his tractor-truck.

If however the stay is too short or if several tractor-trucks are missing, then the semi-trailer 2 also may be actuated by a co-driver using the power hook-up at the low-platform car 4 and corresponding switches at the semi-trailer to move it along the apron so that the train may move on.

To further exploit the facilities and equipment, the invention also suggests passenger auto/piggyback transport using the same or similar aprons and the same road/rail transfer method at the same level, that is, no longer to move up from the rear and down at the front, not on two levels, but only on one.

The procedure to-date incurs severe drawbacks that much degrade the incipient market. Several hours are required finding and moving onto the railroad cars. The same applies to driving off, with only one auto after another moving off the train. Because the train cannot accept vehicles at intermediate stations and vice-versa cannot discharge them at stops on the way, the frequency and the degree of exploitation of the plant is restricted solely to specific times and specific loading and unloading places, whereby many individual customers fail to have their desires met.

The problem of vehicle damage and assurance against shipping damages entails additional cost of personnel to ascerting extant and new damages. These conditions are all caused by the complex procedure of getting on and off the train and by the primitive locking and the double levels. In case of rain, rust water drips from the superstructure and chains on the vehicles below and spoils the paint, as is known. Only good prior waxing will help. Moreover tall persons must stoop when moving from and to their own cars at the lower level.

As regards a passenger vehicle, being smaller, the motion from the apron onto a low-platform car at the same level also may take place at an angle substantially less than 90°. A double-side apron will much facilitate the process and assure high reliability. Thereupon parking can be carried out tightly if the passenger vehicles were provided with additional steering of the rear wheels, the way some Japanese cars are (ADAC Motorwelt, May 1987, p. 53), in which case they also would be synchronized for a larger steering angle and slow motion. In that event, it is possible to move from an initial position on the apron parallel to the apron edge, and by zig-zag motion forward, rearward, even for tight spaces, transversely to the low-platform car, as far as the center position. Because the tires of the passenger autos are very narrow, it may happen in practice that the gap between the edges of the apron and of the low-platform car will be excessive, even though this problem has not occurred so far for automobiles on subways or other trains.

Figure 8A:
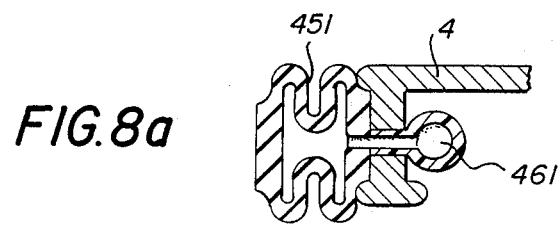
FIGS. 8a and 8b show in cross-section embodiments of the apparatus of the present invention and also apparatus for passenger-auto piggyback traffic.
Figure 8B:
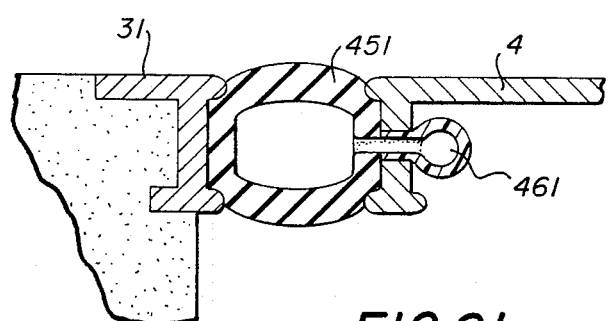

A solution also can be proposed for that circumstance: the lateral edges of the low-platform cars 4 in FIGS. 8a and 8b are equipped with inflatable air hoses 451. They are collapsed during travel and while entering between the aprons as shown in FIG. 8a. After the train stops, they are inflated by the compressed-air line 461 as shown in FIG. 8b in synchronization with and by similar controls as relate to opening and closing the doors of subways and intercity trains, by actuation of the train personnel.

Compared to steel plates, this design for bridging offers the advantage of not demanding special operators. In the case of winter ice formation, it permits detaching the ice the wall it is known for aircraft wing edges. It is also appropriate to put roofs over the aprons in northern locations where these aprons serve both passenger and truck traffic.

Figure 10:
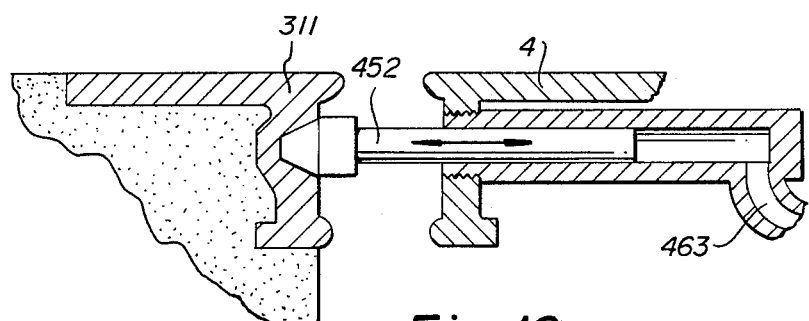
FIG. 10 shows in cross-section another embodiment of an anti-tipping lock.

In similar manner and operated by the brake-air line, latches 452 resting at one site of the side of the low-platform cars 4 and displaced in pneumatic-hydraulic manner within cylinders by means of a line 463, as shown in FIG. 10, can enter the U-channel apron edge 311 and assure anti-tipping during the stay at the station.

The locking of the passenger vehicles on the low-platform cars also can be carried out by driver self-service. One possibility is described in relation to FIG. 9.

Figure 9:
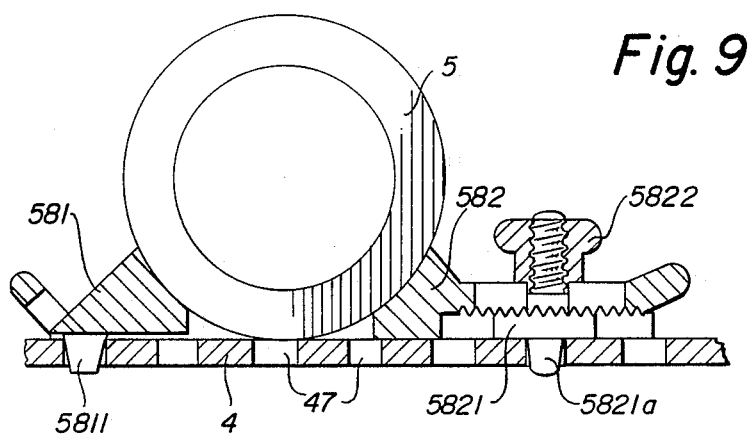
FIG. 9 shows in cross-section an apparatus for securing the position of road vehicles on a low-platform car.

The device of FIG. 9 is shown in elevation. The platform of the low-platform car is cross-sectionally denoted by 4 and by its holes corresponds to the representation of FIG. 5. One of the passenger vehicle wheels 5 is shown.

The drivers carry along with them in their autos:

Wedge-shaped locking skids (or such will be obtained from dispensing equipment made available by the railroad). The locking skids 581; 582 comprise heels 5811; 5821 fitting into the holes 47 of the platform. One locking skid 581 can be pre-inserted and must be non-adjustable; the two-part locking skid 582; 5821 on the other hand is adjustable in such a manner that the heel 5821a can be inserted into a hole 47 and thereupon the wedging rest of the locking skid 582 can be moved in place. This position is secured by the nut 5822.

I claim:
1. A method for combining individual transport by road and railbound train transport with rapid transfer between one transport mode and the other, comprising:
   (a) providing a tractor truck during road shipping of a semi-trailer;
   (b) providing said tractor truck for cross-rolling said semi-trailer onto a low-platform railroad car and using said tractor truck for support for part of a load of said semi-trailer as a power source assisting in docking;
   (c) further providing rollers integral with said semi-trailer and connectable to said track truck with extensible energy lines and rolling said semi-trailer by said rollers onto said low-platform railroad car and disconnecting said energy lines after docking; and (d) thereafter providing said tractor truck for other transport purposes in individual traffic.

2. The method of claim 1, wherein said energy lines are electrical power lines.

3. The method of claim 1, wherein said energy lines are air lines.

4. The method of claim 1, wherein said energy lines are electrical power and air lines.

5. The method of claim 1, wherein said docking of step (b) is carried out by:

(A) locating said semi-trailer parallel to said low-platform railroad car and at the same height of access;

(B) activating said energy lines for lifting and cross-rolling present at said semi-trailer and thereupon mechanically uncoupling said tractor truck from said semi-trailer while keeping said energy lines intact;

(C) using said energy lines from said track truck to move said semi-trailer on said rollers onto said low-platform railroad car; and (D) activating locking means present at said semi-trailer and disconnecting said energy lines to said tractor truck, whereby only said semi-trailer remains on said low-platform railroad car and is shipped by a train.

6. Apparatus for combining individual transport by road and railroad train transport with rapid transfer between one transport made to the other, comprising:

(a) a tractor truck;
(b) a semi-trailer;
(c) a low-platform railway car
(d) means for connecting said tractor truck and said semi-trailer;
(e) rollers integral with said semi-trailer for rolling said semi-trailer onto said low-platform railway car;
(f) extensible energy lines connectable to said rollers and said tractor truck and disconnectable after docking; and
(g) a self-actuated locking system consisting essentially of movable elements are part of the outfitting of said semi-trailer for locking said semi-trailer to said low-platform railroad car.

7. The apparatus of claim 6, wherein said locking system has means for manual actuation.

8. The apparatus of claim 7, wherein said locking system comprises an array of rhombic holes in the platform of said railroad car cooperating with wedge shaped locks attached to said rollers.

9. The apparatus of claim 6, wherein said low-platform railroad car has energy lines connectable to said semi-trailer at least after said tractor-truck has been uncoupled and in that these energy lines are used to service, for instance, refrigerated containers and the rolling system remaining at said semi-trailer, whereby this semi-trailer also can be moved in place even when temporarily no tractor-truck is available.

10. Apparatus for combining individual transport by road and railbound train transport with rapid transfer between one transport made to the other at a railroad apron comprising:

(a) a tractor truck;
(b) a semi-trailer;
(c) a low-platform railway car
(d) means for connecting said tractor truck and said semi-trailer;
(e) rollers integral with said semi-trailer for rolling said semi-trailer onto said low-platform railway car;
(f) extensible energy lines connectable to said rollers and said tractor truck and disconnectable after docking; and
(g) anti-tipping means at an interface between said apron and said low-platform railroad car to prevent tipping of said low-platform railroad car during load-transfer from said apron to said low-platform railroad car on one hand and from said low-platform railroad car to said apron on the other.

11. The apparatus of claim 10, wherein said anti-tipping means comprise U-shaped-sections mounted to the edges of said apron, which together with projections at said low-platform railroad car prevent it from tipping during load transfer.

12. The apparatus of claim 11, wherein said projections at said low-platform railroad car are latches driven in pneumatic-hydraulic manner and are extended by the railroad office during the stay of said low-platform railroad car at said apron.

* * * * *